(12) United States Patent
Vukoszavlyev et al.

(10) Patent No.: US 9,955,350 B2
(45) Date of Patent: *Apr. 24, 2018

(54) MOTION-BASED AUTHENTICATION FOR A GESTURE-BASED DEVICE

(71) Applicant: LogMeIn, Inc., Boston, MA (US)

(72) Inventors: Zoran Vukoszavlyev, Budapest (HU); Marton B. Anka, Windham, NH (US)

(73) Assignee: LogMeIn, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,097

(22) Filed: Nov. 7, 2016

(65) Prior Publication Data
US 2017/0171753 A1    Jun. 15, 2017

Related U.S. Application Data

(63) Continuation of application No. 14/589,571, filed on Jan. 5, 2015, now Pat. No. 9,491,622, and a continuation of application No. 13/337,081, filed on Dec. 24, 2011, now Pat. No. 8,929,546.

(51) Int. Cl.
| | |
|---|---|
| *G06F 7/04* | (2006.01) |
| *H04W 12/06* | (2009.01) |
| *G06F 1/16* | (2006.01) |
| *G06F 21/36* | (2013.01) |
| *H04L 29/06* | (2006.01) |
| *H04W 12/04* | (2009.01) |
| *G06F 3/01* | (2006.01) |
| *G06F 3/0346* | (2013.01) |
| *G06F 3/16* | (2006.01) |

(52) U.S. Cl.
CPC .......... *H04W 12/06* (2013.01); *G06F 1/1694* (2013.01); *G06F 3/017* (2013.01); *G06F 3/0346* (2013.01); *G06F 3/167* (2013.01); *G06F 21/36* (2013.01); *H04L 63/06* (2013.01); *H04W 12/04* (2013.01)

(58) Field of Classification Search
CPC ........ H04W 12/06; H04W 12/04; H04L 63/06
USPC ........................................................ 726/17
See application file for complete search history.

(56) References Cited

U.S. PATENT DOCUMENTS

| | | | |
|---|---|---|---|
| 2005/0140964 A1* | 6/2005 | Eschenauer | H04L 63/1408 356/10 |
| 2012/0124662 A1* | 5/2012 | Baca | G06F 21/32 726/17 |

* cited by examiner

*Primary Examiner* — Teshome Hailu
(74) *Attorney, Agent, or Firm* — David H. Judson (57) ABSTRACT

A motion-based authentication method is operative in a mobile computing device having a display interface and that includes an accelerometer. Normally, the device software includes a locking mechanism that automatically locks the display interface after a configurable timeout. The authentication method operates to un-lock the display interface (and thus allow the user access to the device) by movement of the device in a predetermined series of physical movements and without display-based entry of a password or other access code on the display itself. In this manner, the user can un-lock the device without display-based entry of a password (on the display itself) by simply holding the device and performing the necessary movement(s) to generate the unique code.

11 Claims, 6 Drawing Sheets

MOTION-BASED AUTHENTICATION FOR A GESTURE-BASED DEVICE

BACKGROUND

Technical Field

This disclosure relates generally to authentication technologies that enable a user of a mobile device to un-lock and access his or her mobile device without display-based entry of a password or other access code on the display itself.

Background of the Related Art

Mobile devices, such as a smartphone or tablet (e.g., Apple iPhone® and iPad® tablet), have become ubiquitous in today's society. Faster processors, more memory, higher quality gesture-based multi-touch screens, availability of mobile broadband data, and integration of multi-media and GPS chips along with open interface mobile operating systems, have opened the door for creation of a large variety of mobile applications. Typically, a mobile device includes a configuration option by which the device screen automatically locks after a configurable time following a last user action with respect to some screen element. This automatic locking function is then overridden (when the user attempts to take a new action) if the user can first enter his or her password successfully. Password entry typically involves the user entering his or her password in a password entry screen using the keys of a software-generated numerical or other keypad.

BRIEF SUMMARY

A motion-based authentication method is operative in a mobile computing device having a display interface and that includes an accelerometer. The device uses positional information provided by the accelerometer to identify the device's position. The device software includes a locking mechanism that automatically locks the display interface after a configurable timeout. The authentication method of this disclosure operates to un-lock the display interface (and thus allow the user access to the device) in the following manner.

The method begins by displaying a graphic element as the mobile computing device is at a fixed position with respect to a user's hand. The graphic element may be a representation of a directional arrow. After receipt of data indicating a first movement of the mobile computing device in a first predetermined manner, a first visual indication is provided on the graphic element. The first visual indication may be a display of a given color, the display of a number based on the nature of the first movement, a combination thereof, or the like. The visual indication on the graphic element provides a visual feedback (cue) to the user of the nature and extent of the movement that generates it. A first data value associated with the first visual indication is generated and stored. The user then returns the mobile computing device to the fixed position. After receipt of data indicating a second movement of the mobile computing device in a second predetermined manner, a second visual indication is provided with respect to the graphic element. The second visual indication may be display of a given color, the display of a number based on the nature of the first movement, a combination thereof, or the like. Unless the first and second movements are the same, typically the first and second visual indications will differ from one another. Thus, for example, the first movement causes the arrow to turn green, while the second (different) movement causes the arrow to turn red. Once again, the second visual indication on the graphic element provides a visual feedback to the user of the nature and extent of the movement that generates it. A second data value associated with the second visual indication also is generated and stored. The process then continues for zero or more additional movements, thereby generating zero or more respective additional data values.

The data values comprise a unique code for use in providing access to the device.

Preferably, the unique code is created during a password registration process with the user performing the movement(s) required (and the device storing the user-generated code). Thereafter, the code is entered to un-lock the display interface.

The physical movements may occur about a three-dimensional (3D) rotational space utilizing multiple degrees of freedom.

An additional graphic element may be displayed to provide the user a progress indication as a further visual cue regarding how many movements are still necessary to generate the required digits of the code.

Using this authentication technique, the mobile computing device may be un-locked and accessed without display-based entry of a password or other access code on the display itself. The user can un-lock his or her device without display-based entry of a password of other access code on the display itself, namely, by holding the device and performing the necessary movement(s) to generate the unique code.

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

As described above, this disclosure provides a motion-based authentication method that is operative in a mobile computing device having a display interface and that includes an accelerometer. Normally, the device software also includes a locking mechanism that automatically locks the display interface (or, more generally, the device itself) after a configurable timeout. In operation, the authentication method operates to un-lock the display interface (and thus allow the user access to the device) by movement of the device in a predetermined series of physical movements and without display-based entry of a password or other access code on the display itself. In this manner, the user can un-lock his or her device without display-based entry of a password or other access code on the display itself, namely, by holding the device and performing the necessary movement(s) to generate the unique code.

Figure 1:
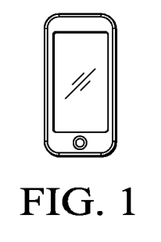
FIG. 1 is an exemplary mobile device in which the motion-based authentication method of the disclosure is implemented.
Figure 2:
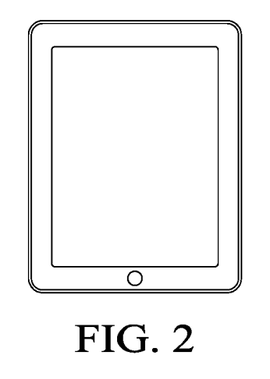
FIG. 2 is an exemplary tablet device in which the motion-based method may be implemented.
Figure 3:
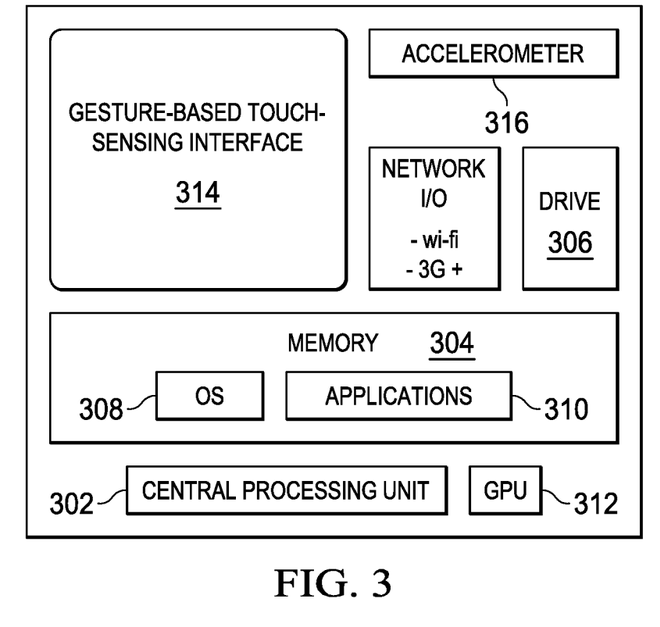
FIG. 3 illustrates representative hardware elements of the mobile device.

Preferably, the mobile device is a smartphone or tablet, such as the iPhone® or iPad®, an Android™-based mobile device, or the like. As seen in FIG. 3, the device 300 comprises a CPU (central processing unit) 302, such as any Intel- or AMD-based chip, computer memory 304, such as RAM, and a drive 306. The device software includes an operating system (e.g., Apple iOS, Google® Android, or the like) 308, and generic support applications and utilities 310. The device may also include a graphics processing unit (GPU) 312. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. Typically, the touch screen is positioned over or in front of a display screen, integrated with a display device, or it can be a separate component, such as a touch pad. The touch-sensing device is based on sensing technologies including, without limitation, capacitive sensing, resistive sensing, surface acoustic wave sensing, pressure sensing, optical sensing, and/or the like. The touch-sensing can be based on single point sensing or multipoint sensing. Single point sensing is capable of only distinguishing a single touch, while multipoint sensing is capable of distinguishing multiple touches that occur at the same time. The touch-sensing can include actual contact of the touch-sensing device, near-touch of the touch-sensing device (e.g. detecting hovering), or remote detection of the user by the touch-sensing device.

The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The mobile device preferably includes a 3-axis accelerometer 316 that measures acceleration. Signals output from the accelerometer 316 indicate the orientation of the device, typically relative to fixed platform, such as the earth's surface. The mobile device may also include a gyro (not shown), which measures rate of rotation around a particular axis.

Typically, the device application software provides a display locking mechanism by which the display interface (except for password entry) or the device itself (or some application or the like) is locked after a configurable inactivity timeout.

Motion-Based Authentication

As described above, a motion-based authentication method according to this disclosure is operative in a mobile computing device, such as shown in FIG. 3, having a display interface that supports gesture-based control operations. The mobile computing device includes a display application that has been augmented to provide the described functionality. In the alternative, the device operating system (such as on an Android-based device) may be configured to replace the display home screen, in which case the approach may be implemented to lock/un-lock the entire device or other application (and not simply the display interface).

As described above, the basic technique involves storing and then re-generating a user-specific password (or, more generally, an "authentication key" or a "unique code") using one or more physical movement(s) of the device, preferably while the device is maintained with or within the user's hand. Preferably, a series of particular movements (which should be memorized) define the unique code, and then these movements must be repeated in the same sequence to recreate the password. Typically, the password is created during a password registration process during which the user is prompted by appropriate device (aural, visual or otherwise) instructions. FIGS. 4-11 illustrate the typical use case. The user undertakes the first movement to create a first password digit, then a second movement to create a second password digit, and so forth, until all password digits are generated. Typically, each movement is mutually independent; thus, preferably the password-generation process is carried out with respect to a "fixed" position. A first movement from the fixed position generates the first digit; the second movement from the fixed position generates the second digit, and so forth. In an alternative, but somewhat more complex implementation, the movements need not be mutually independent (and thus initiated from the same fixed start position). In this embodiment, a first movement from the fixed position generates the first digit; a second movement from the position of the device at the end of the first movement generates the second digit, and so forth.

The number of digits in the password determines its strength, in the usual manner. A longer password requires more (additional) movements, but it is more difficult to re-create after-the-fact. Of course, a password may be generated from one or more movements, but typically at least two movements (two digits) are required for basic security. Typically, for ease of memory and re-generation, a password will comprise about four (4) distinct movements.

The mobile device accelerometer generates position signals that are received, interpreted and stored as needed to reflect the position of the device, typically with respect to a fixed plane (such as a mobile device as it is positioned within the user's open palm). The accelerometer signals may be augmented with rotational signals generated by a gyro (if the device includes one). The outputs generated from the accelerometer (and gyro) provide movement and position information that is received by the motion-based authentication routine. Generalizing, the movement and position information represents a physical movement of the device about any aspect of a three-dimensional (3D) space in which the device is being held by the user. Thus, the authentication routine may receive information (including pitch, roll, yaw, translation, up, down, shake, and combinations thereof) in any of six degrees of freedom. As noted above, such information causes a visual cue to be presented to the user and then "saved" as a value of the password.

The drawings illustrate various embodiments of how the visual feedback cues may be provided to the user. These are merely illustrative of the overall concept, as other visual cues may be provided using other types of graphic elements, colorations, text, and combinations thereof. If desired, one or more visual cues may be combined with or substituted with an aural cue (e.g., a beep, a tone, or the like).

Figure 4:
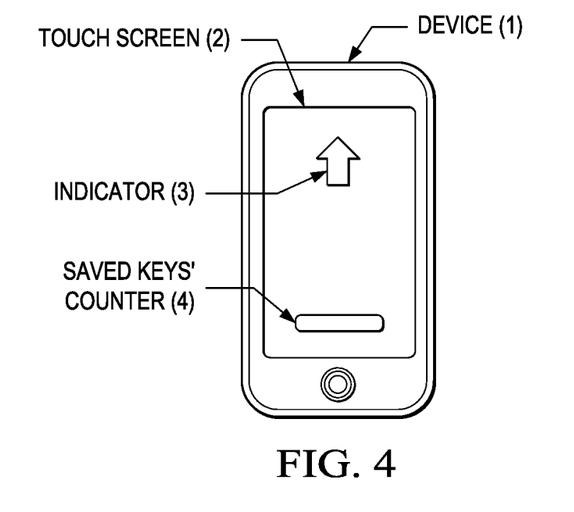
FIG. 4 is a display interface of the mobile device showing a first embodiment of a graphic element for use to facilitate the described method.
Figure 5:
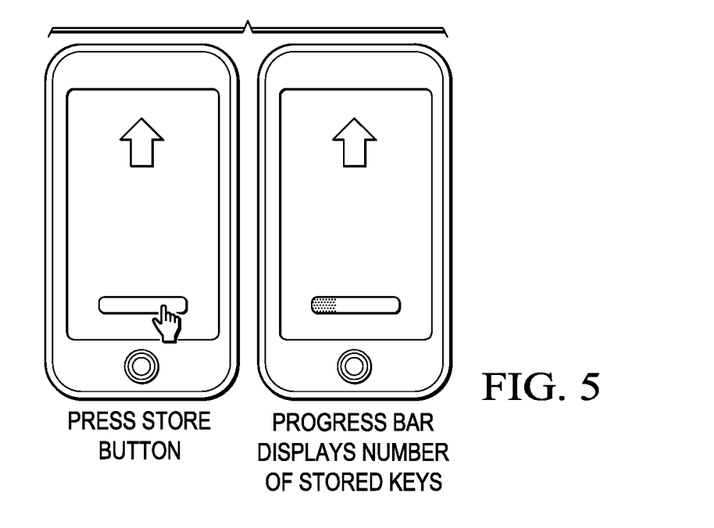
FIG. 5 illustrates the display interface of FIG. 4 and shows how a particular digit/element of the motion-based password may be saved during a registration process.

FIG. 4 shows the display interface of the mobile device (1) showing a first display view. The basic user interface (UI) (2) comprises contains one or more indicator arrows (3) and a small bar (4), which bar preferably displays a length of the stored password (authentication key). When the user turns the device toward the arrowhead, preferably the arrow's color changes and a number appears within the arrow. Preferably, the number value depends on an angle that the user turns the phone. Thus, for example, every "n" (e.g., three) degree rotation increases by one the displayed number. When the user reaches a desired color and angle and maintains the device in that position for a given time (e.g., two seconds), the routine appends that direction-color combination to an existing authentication code. As the value is saved, the progress bar is updated to display the then-current key length. This is illustrated in FIG. 5. If user presses the progress bar, as illustrated, the authentication code is saved. Preferably, the authentication code is saved without having the user take any physical action with respect to the display itself, such that when the last digit of the code is entered, the overall code is saved.

Figure 6:
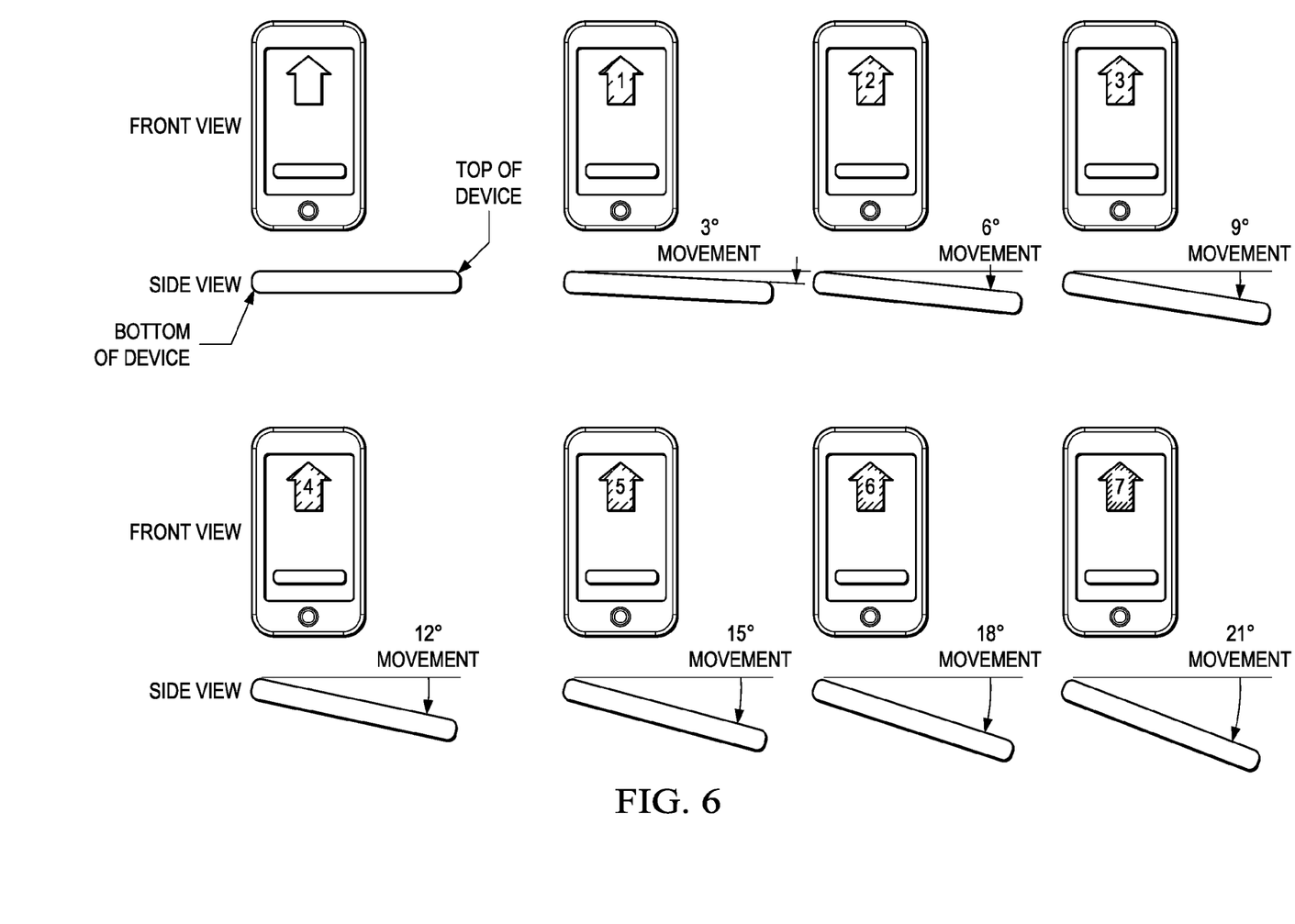
FIG. 6 illustrates representative visual cues that are generated by physical movements of the device.

FIG. 6 illustrates respective front and side views for the first embodiment. In this example, each progressive 3° turn of the device in the user's hand increments the code value.

Figure 7:
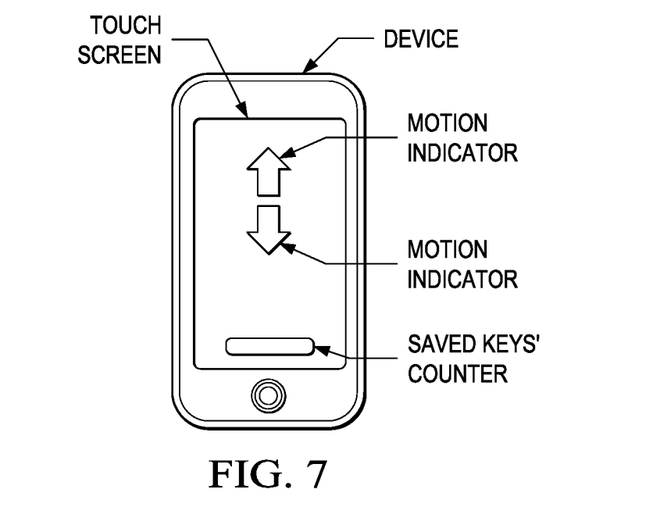
FIG. 7 is a display interface of the mobile device showing a second embodiment using a pair of graphic elements.
Figure 8:
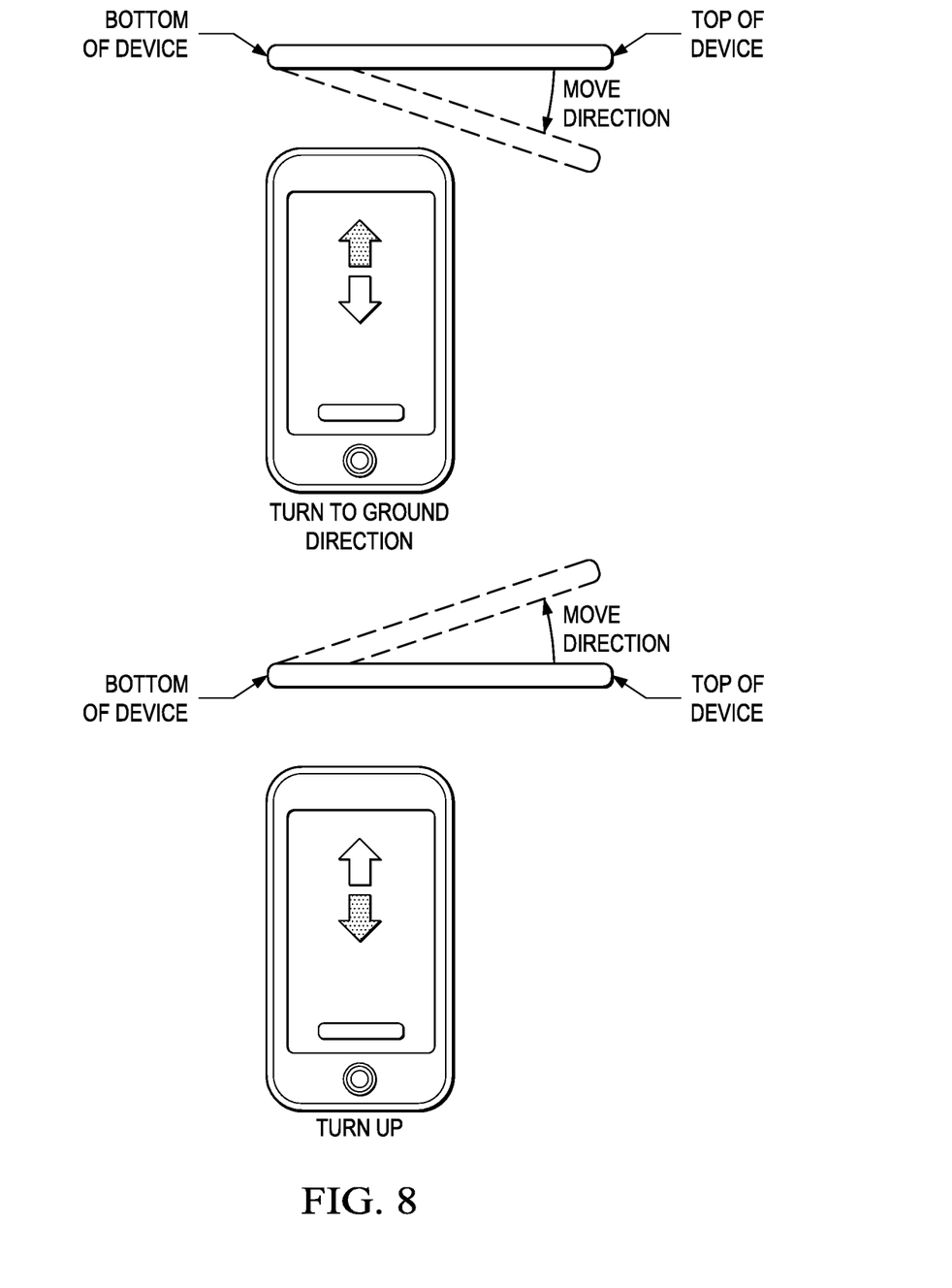
FIG. 8 illustrates the display interface of FIG. 7 during an un-locking operation.

FIG. 7 illustrates a second embodiment wherein the display interface comprises a pair of arrows that are used to provide the visual cues. FIG. 8 illustrates how respective motion (toward the ground, or toward the user) changes which arrow is selected.

Figure 9:
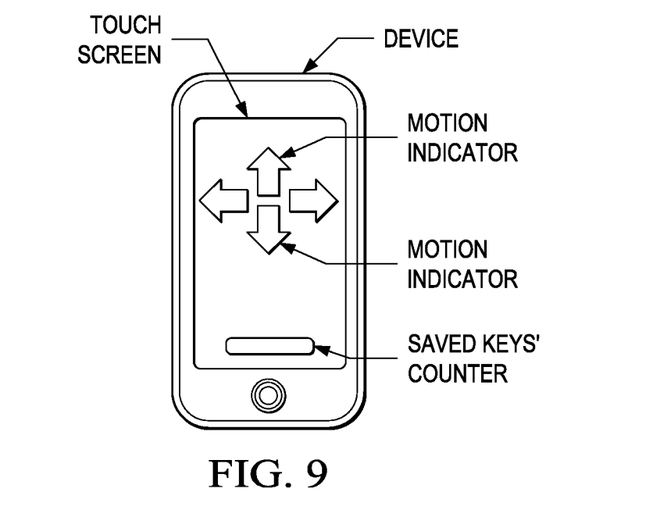
FIG. 9 is a display interface of the mobile device showing a third embodiment using four (4) graphic elements.
Figure 10:
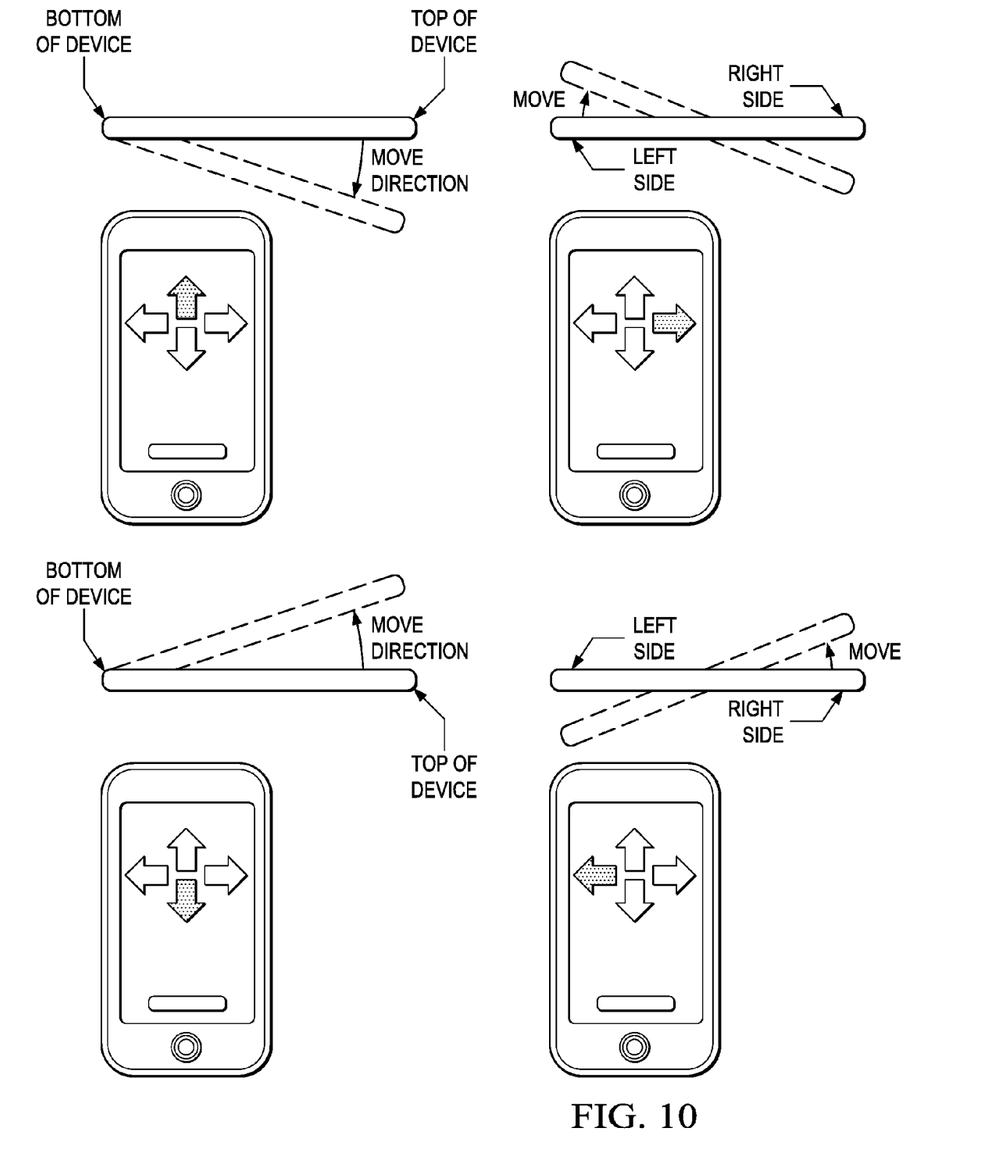
FIG. 10 illustrates the display interface of FIG. 9 during an un-locking operation.

To raise the complexity of authentication codes that may be generated, a four (4) arrow solution may be implemented, such as shown in FIG. 9. In this embodiment, the top and bottom arrows may behave as in the 2 arrow mode embodiment (FIG. 7 and FIG. 8); the left and right arrows preferably are colors when the user turns the device around the vertical axis of the device body. FIG. 9 illustrates how the various movements change the generated visual cues.

The basic operation of the authentication routine is implemented in software, as a series of program instructions that are compiled into executable form and executed in a processor. When the application starts, it checks whether authentication key has been stored already. If the authentication key is missing, the application displays a default screen (e.g., FIG. 4, FIG. 7, or FIG. 9), and the user is prompted to set up his or her own authentication code. If during this process, either the user cancels or a movement cannot be ascertained, the application returns or ends. When the user completes the setup, the new key is stored. Preferably, the routine runs continually as a background process; in the alternative, the routine may be started upon a given occurrence such as initial turn-on of the device, within a given time following initiation of the lockout time, or following a user action to select the functionality. As described, the key code comprises a series of movements that create a set of corresponding direction-color pair values. When these movements are successfully re-created, the device or display interface is un-locked.

In an alternative embodiment, the display element is an arrow or other element whose color varies along a gradient. As the movement progresses in the desired direction/angle, the color of the arrow varies along the gradient. Thus, the user's password might simply comprise a stored and then-recalled color combination, such as "red-blue-green" or the like.

With various display changes, any particular authentication key may be defined and recalled as needed.

As another alternative, the device may include a biometric sensor that is programmed to recognize a feature of the user's hand (or other physical characteristic) before the password (entered by the movements) is accepted. This can provide an additional degree of security for the scheme. Another alternative is to couple the described scheme with an intelligent assistant (such as Apple Siri™), such that one or more voice-based commands must accompany the physical movements before the password is accepted.

As yet another alternative, the device may include a "shake" application that performs an action when the user "shakes" the device. The user's password may then comprise a combination of a particular movement (as described above) and a "shake."

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows:

1. Mobile device apparatus, comprising:
  a device display;
  one or more processors;
  computer memory holding computer program instructions executed by the one or more processors to protect access to a component of the apparatus except upon entry of a color-based password, the computer program instructions comprising program code configured:
  (i) after receipt of data indicating a first movement in a first predetermined manner, to generate, as an authentication key, a first value, the first movement being identified on the device display by a first color;
  (ii) to respond to repetition of step (i) using one or more additional movements to generate at least one or more additional values, at least one additional movement being identified on the device display by a second color;
  (iii) to concatenate into the authentication key the one or more additional values; and
  (iv) to verify the authentication key and at least one other ancillary condition before enabling access to the component.

2. The mobile device apparatus as described in claim 1 wherein the ancillary condition is receipt of a determination generated by a biometric sensor, the determination being that the first movement and the one or more additional movements are being carried out by a permitted user of the mobile device apparatus.

3. The mobile device apparatus as described in claim 1 wherein the ancillary condition is receipt of a determination generated by a voice detection sensor, the determination being that the first movement and the one or more additional movements are being carried out by a permitted user of the mobile device apparatus.

4. The mobile device apparatus as described in claim 1 wherein the ancillary condition is detection of a shake movement.

5. The mobile device apparatus as described in claim 1 wherein the first color is not displayed on the device display until a direction and angle of the mobile device correspond to a first position.

6. The mobile device apparatus as described in claim 5 wherein the program code is configured to display color on the device display according to a gradient, and to vary the color displayed until the direction and angle of the mobile device correspond to the first position.

7. The mobile device apparatus as described in claim 1 wherein the program code is configured to display an additional graphic element to provide a progress indicator as a visual cue to the user.

8. An article associated with a mobile device apparatus having a device display, the article comprising a non-transitory machine-readable medium that stores a program, the program being executable by one or more processors of the mobile device apparatus, the program comprising computer program instructions executed by the one or more processors to protect access to a component of the mobile device apparatus except upon entry of a color-based password, the computer program instructions comprising program code configured:
  (i) after receipt of data indicating a first movement in a first predetermined manner, to generate, as an authentication key, a first value, the first movement being identified on the device display by a first color;
  (ii) to respond to repetition of step (i) using one or more additional movements to generate at least one or more additional values, at least one additional movement being identified on the device display by a second color;
  (iii) to concatenate into the authentication key the one or more additional values; and
  (iv) to verify the authentication key and at least one other ancillary condition before enabling access to the component.

9. The article as described in claim 8 wherein the ancillary condition is receipt of a determination generated by a biometric sensor, the determination being that the first movement and the one or more additional movements are being carried out by a permitted user of the mobile device apparatus.

10. The article as described in claim 8 wherein the ancillary condition is receipt of a determination generated by a voice detection sensor, the determination being that the first movement and the one or more additional movements are being carried out by a permitted user of the mobile device apparatus.

11. The article as described in claim 8 wherein the ancillary condition is detection of a shake movement.

* * * * *